(12) United States Patent
Satoh et al.

(10) Patent No.: US 7,165,841 B2
(45) Date of Patent: Jan. 23, 2007

(54) STEREOSCOPIC IMAGE DISPLAY APPARATUS

(75) Inventors: Hideo Satoh, Tsurugashima (JP);
Takashi Chuman, Tsurugashima (JP);
Yoshihiko Uchida, Tsurugashima (JP);
Atsushi Yoshizawa, Tsurugashima (JP);
Takuya Hata, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 43 days.

(21) Appl. No.: 10/761,352

(22) Filed: Jan. 22, 2004

(65) Prior Publication Data

US 2004/0150792 A1 Aug. 5, 2004

(30) Foreign Application Priority Data

Jan. 24, 2003 (JP) ............... 2003-015934

(51) Int. Cl.
G03B 21/00 (2006.01)
H04N 13/04 (2006.01)
G02B 27/22 (2006.01)

(52) U.S. Cl. ............... 353/7; 348/52; 359/468
(58) Field of Classification Search ............. 353/7–10; 359/462, 464, 472–479, 466–469; 348/40–42, 348/51, 52, 54; 349/15
See application file for complete search history.

(56) References Cited

U.S. PATENT DOCUMENTS

| | | | |
|---|---|---|---|
| 3,178,720 A | * | 4/1965 | Collender ............ 359/468 |
| 5,057,827 A | * | 10/1991 | Nobile et al. ............ 345/31 |
| 6,005,608 A | * | 12/1999 | Chakrabarti ............ 348/46 |
| 6,302,542 B1 | * | 10/2001 | Tsao ............ 353/7 |

FOREIGN PATENT DOCUMENTS

| | | |
|---|---|---|
| DE | 44 24 887 A1 | 1/1995 |
| EP | 0 887 783 A2 | 12/1998 |
| JP | 2000-115812 | 4/2000 |
| WO | WO 99/34247 | 7/1999 |

OTHER PUBLICATIONS

European Search Report dated Apr. 19, 2004.

* cited by examiner

*Primary Examiner*—W. B. Perkey
*Assistant Examiner*—Andrew Sever
(74) *Attorney, Agent, or Firm*—McGinn IP Law Group, PLLC

(57) ABSTRACT

A stereoscopic image display apparatus includes at least two linear image display devices which respectively display linear images in response to image signals. The two linear image display devices are periodically moved by a mechanical scan mechanism along a plurality of locus planes substantially parallel to each other. The mechanical scan mechanism may have a configuration which belt-drives the at least two linear image display devices fixed to a belt, or a configuration which rotationally drives the at least two linear image display devices provided on a disc. The stereoscopic image display apparatus can display a bright and extremely clear stereoscopic image without using a complicated optical system and a light transmissible display panel.

18 Claims, 7 Drawing Sheets

STEREOSCOPIC IMAGE DISPLAY APPARATUS

BACKGROUND OF THE INVENTION

1) Field of the Invention

The present invention relates to a stereoscopic image display apparatus.

2) Description of the Related Art

A stereoscopic image display apparatus for displaying a stereoscopic image having a three-dimensional impression on a two-dimensional screen is disclosed, for example, in Japanese Patent Kokai No. 2000-115812. As shown in FIG. 1 of the accompanied drawings, the stereoscopic image display apparatus disclosed in the above-mentioned Japanese Patent Kokai No. 2000-115812 uses liquid crystal panels 1 and 2, and a half mirror 3. As illustrated in FIG. 1, an observer can simultaneously observe a light beam 4 transmitted through the half mirror 3 and a light beam 5 reflected by the half mirror 3. The light beam 4 is emitted from a displayed image on the liquid crystal panel 1, and the light beam 5 is emitted from a displayed image on the liquid crystal panel 2. Accordingly, the two displayed images can be observed by the observer as if those images are respectively positioned forward and backward. In this instance, when a brightness balance of the two liquid crystal panels is properly adjusted, the apparatus provides the observer with an image having a three-dimensional impression.

Another technique, for example, shown in FIG. 2 of the accompanied drawings is also widely known in the art as an alternative technique of the conventional stereoscopic image display apparatus. The stereoscopic image display apparatus shown in FIG. 2 provides the observer with an image having a three-dimensional impression on the principle that two organic electroluminescence panels are combined as a front and a back panel, which thus synthesizes a light beam 9 from the front panel 7 having light transmissibility and a light beam 8 from the back panel 6, thereby providing the observer with overlapped images which are respectively displayed on the panels.

The technique shown in FIG. 1 requires an optical arrangement of the two display panels and the half mirror. This arrangement requires accurate positioning of the constituent elements to a level of a single pixel. Accordingly, the apparatus becomes complicated and large. The technique shown in FIG. 2 requires the front panel which is made from a material providing light transmissibility. Accordingly, a manufacturing method is complicated, which causes problems such as an increased manufacturing cost and a reduced product yield. Furthermore, a part of the light beam from the front panel may go toward the back panel, which causes a reflection of the display image of the front panel on the back panel.

SUMMARY OF THE INVENTION

One object of the present invention is to provide a stereoscopic image display apparatus which displays a clear stereoscopic image without using a device such as a complicated optical system and an expensive light transmissible panel.

According to one aspect of the present invention, there is provided an apparatus including at least two linear image display devices for respectively displaying linear images in response to image signals, and a moving mechanism section for periodically moving the linear image display devices along respective locus planes parallel to each other.

The stereoscopic image display apparatus of the present invention thus displays a bright and extremely clear stereoscopic image without using the complicated optical system and the expensive light transmissible panel.

DETAILED DESCRIPTION OF THE INVENTION

Figure 1:
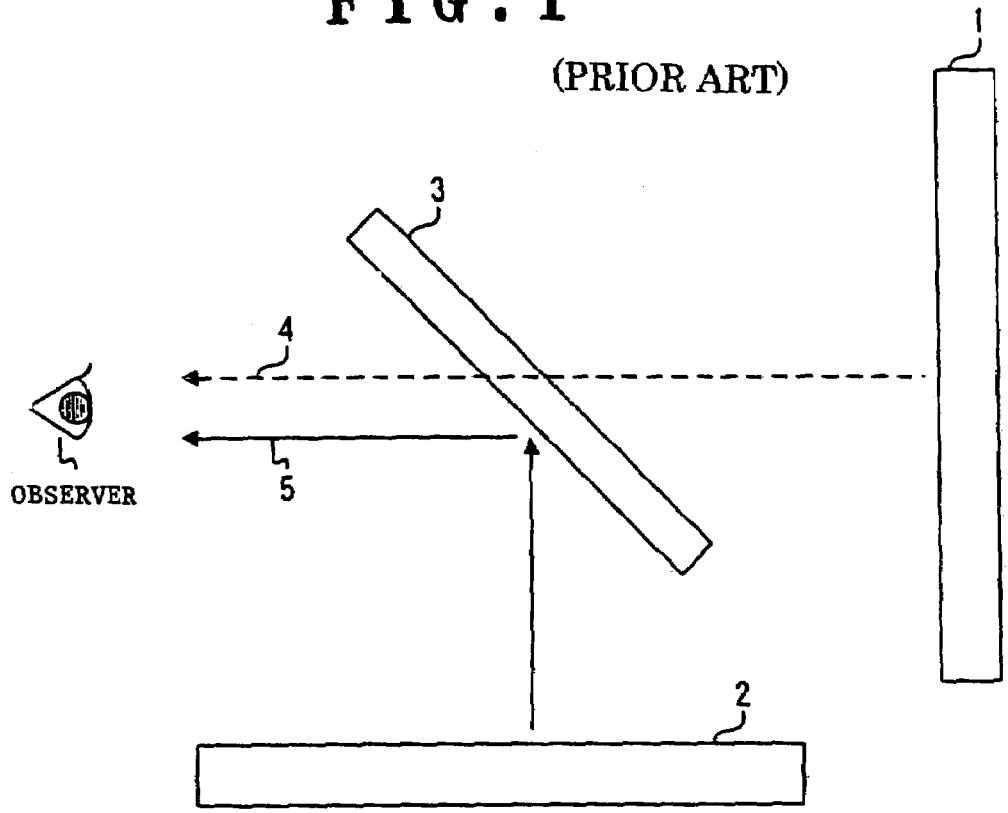
FIG. 1 is a schematic construction drawing showing a structure of a conventional stereoscopic image display apparatus.
Figure 2:
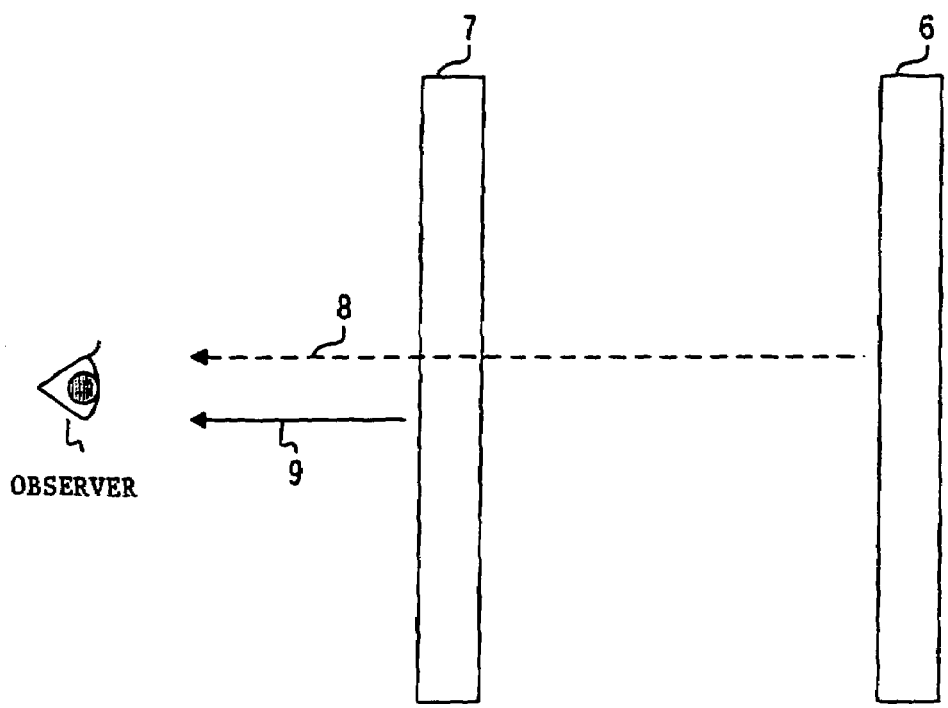
FIG. 2 is a schematic construction drawing showing a structure of another conventional stereoscopic image display apparatus.
Figure 3:
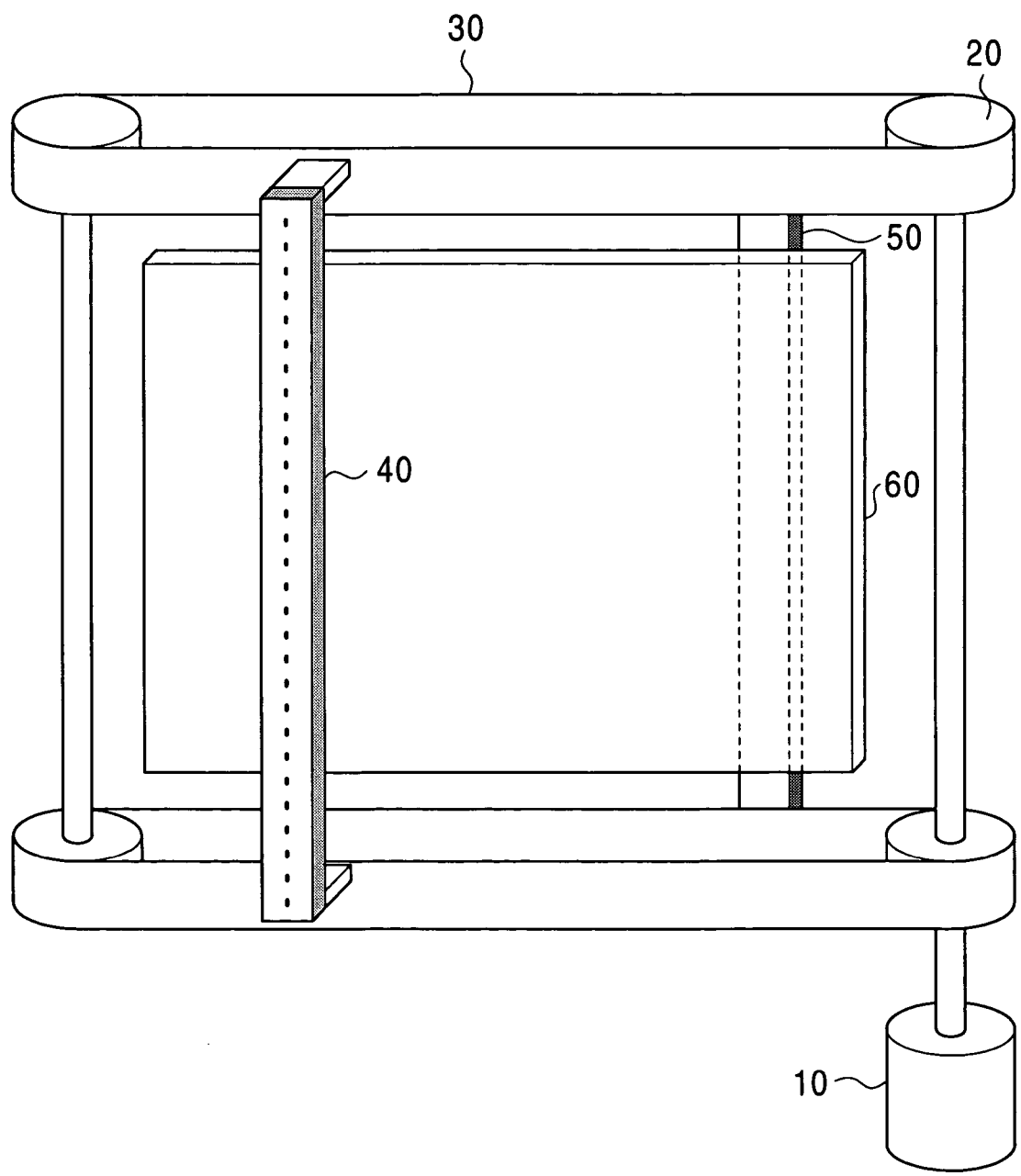
FIG. 3 is a schematic perspective view showing a structure of a stereoscopic image display apparatus according to a first embodiment of the present invention.

Referring to FIG. 3, a drive motor 10, e.g., a servo motor, directly rotationally drives a belt-driven pulley 20 fixed to a rotating shaft of the motor 10 based on a control signal from a drive control circuit (not shown).

The belt-driven pulley 20 transmits rotational movements of the drive motor 10 to a drive belt 30.

The drive belt 30 is used for transmitting motive power, and extends between two belt-driven pulleys 20. The two belt-driven pulleys 20 are positioned to have a predetermined distance therebetween. The drive belt 30 is driven in a predetermined direction at a predetermined velocity by the drive motor 10 via the belt-driven pulleys 20. It should be noted that a power transmitting mechanism in this embodiment is not limited to the belt-driven pulleys 20 and the drive belt 30 shown in FIG. 3. The power transmitting mechanism may use, for example, a gear and a chain. Alternatively, various power transmitting members may be combined to form the drive mechanism, provided that the drive mechanism can transmit rotational movements to horizontal directional movements.

Two sets of mechanisms each including the belt-driven pulleys 20 and the drive belt 30 are respectively provided at an upper and a lower side of the apparatus in order to hold both ends of linear image display devices 40 and 50 (described below) so as to support the linear image display devices 40 and 50 in the vertical direction, i.e., longitudinal direction of the linear image display device.

Upper ends of the linear image display devices 40 and 50 are attached to the upper drive belt 30 at predetermined locations of the upper drive belt and lower ends of the linear image display devices 40 and 50 are attached to the lower drive belt 30 at predetermined locations of the lower drive belt by means of predetermined fastening members. Accordingly, the drive belts 30 drive the linear image display devices in a direction perpendicular to display directions of the two linear image display devices, while keeping the positional relationship between the two linear image display devices.

The linear image display devices 40 and 50 are, for example, LED arrays each having 120 independent LEDs aligned linearly in the longitudinal direction of the linear image display device. It should be noted that the number and the type of light emitting elements used for the linear image display devices are not limited to the above mentioned number and type. Each linear image display device may have a configuration using another light emitting elements such as light bulbs, organic electroluminescence devices, and electron emission devices for an FED (Field Emission Display). Alternatively, each linear image display device may have a configuration using one point source, which scans over the linear image display device in a longitudinal direction by the light emitted from the source.

Although both of the linear image display devices have the same configuration with respect to each other, the linear image display device 40 is fixed to the drive belt 30 at a distance L1 apart from the belt surface by the fastening member attached to the drive belt 30, whereas the linear image display device 50 is fixed to the drive belt 30 in a similar manner at a distance L2 apart from the belt surface.

Figure 4:
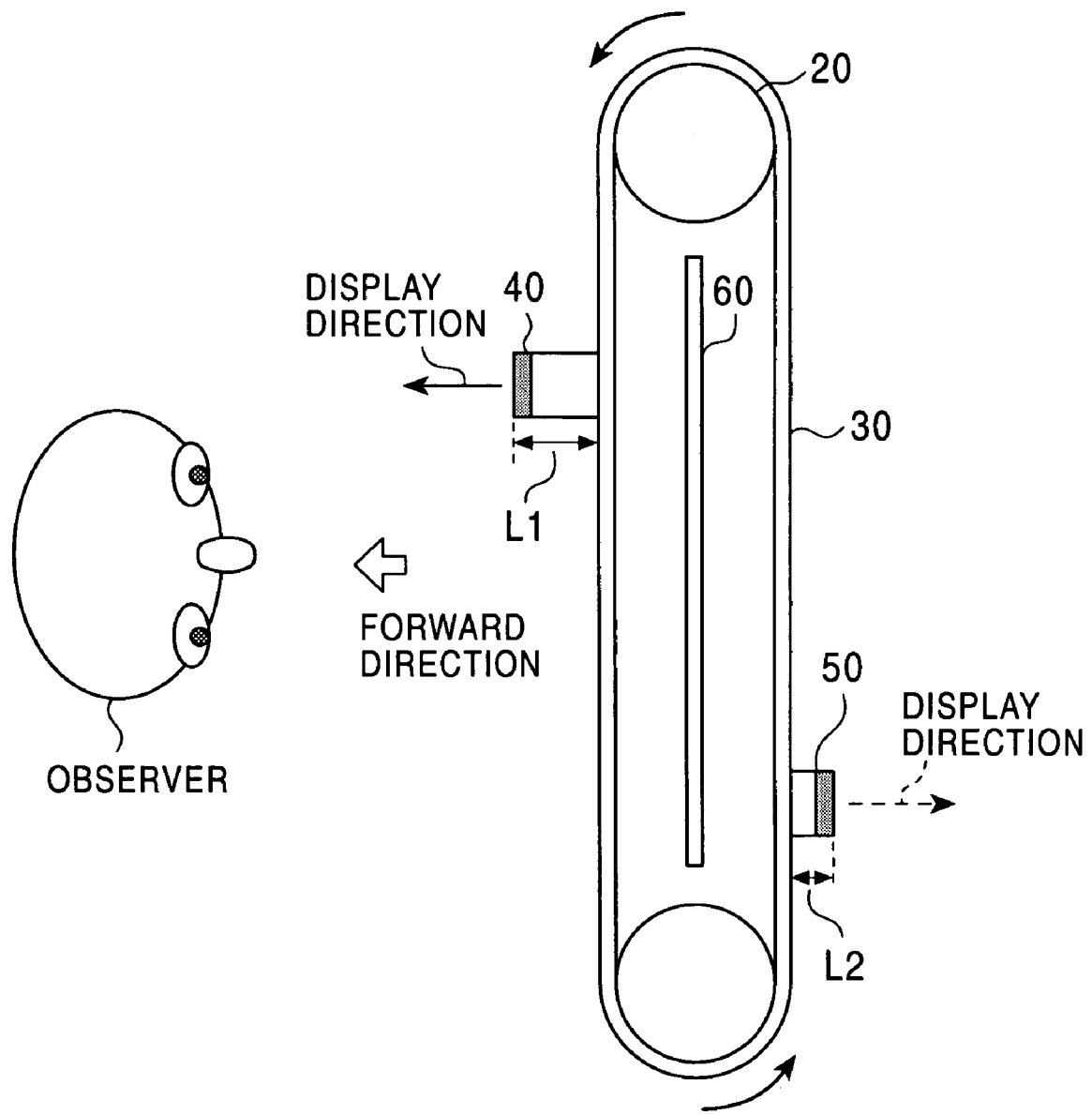
FIG. 4 is a schematic top view showing a top view of the stereoscopic image display apparatus shown in FIG. 3.

When viewing the apparatus from above, an antireflective device 60 is provided within the circle of the drive belt 30 which is stretched between the two pulleys. The antireflective device prevents reflection of the light coming from the linear image display devices 40 and 50, or from the front of the stereoscopic image display apparatus. As shown in FIG. 4, a side of the stereoscopic image display apparatus facing the observer is defined as a front side, and a direction toward the observer is defined as a forward direction of the stereoscopic image display apparatus, which will be used in the following description.

Referring to FIG. 4, a construction drawing of the linear image display device is shown which is viewed from above the device along the longitudinal direction. The purpose of FIG. 4 is to clarify the structure of the embodiment shown in FIG. 3 and to illustrate the positional relationship between the constituent elements thereof. It should be noted that a driving direction of the drive belt 30 is not limited to the direction shown by arrows in FIG. 4, and therefore an opposite direction may be acceptable.

An operation of the display apparatus of the embodiment shown in FIGS. 3 and 4 will be hereinafter described.

As the drive belt 30 is driven in one direction at a predetermined velocity by the drive motor 10 via the belt-driven pulley 20, the linear image display devices 40 and 50 attached to the drive belt 30 are also driven at the predetermined velocity in a direction perpendicular to display directions of the devices. For example, when the velocity of the drive belt 30 is set in such a manner that the drive belt 30 makes a round of the two pulleys in 1/60 seconds (approximately 16.7 mS), the linear image display devices 40 and 50 respectively cross the front side of the stereoscopic image display apparatus 60 times per second. It should be noted that the drive velocity of the linear image display devices 40 and 50 is not limited to the above velocity.

As shown in FIG. 4, the two linear image display devices 40 and 50 are fixed to the drive belt 30 maintaining a predetermined positional relationship with respect to each other. Furthermore, as mentioned above, the linear image display device 40 is positioned at the distance L1 apart from the belt surface of the drive belt 30, whereas the linear image display device 50 is positioned at the distance L2 apart from the belt surface of the drive belt 30. Therefore, light emitted from either one of the linear image display devices is not intercepted by the other linear image display device. Moreover, no reflection of the emitted light occurs from either one of the linear image displaying devices on the other linear image display device.

Figure 5:
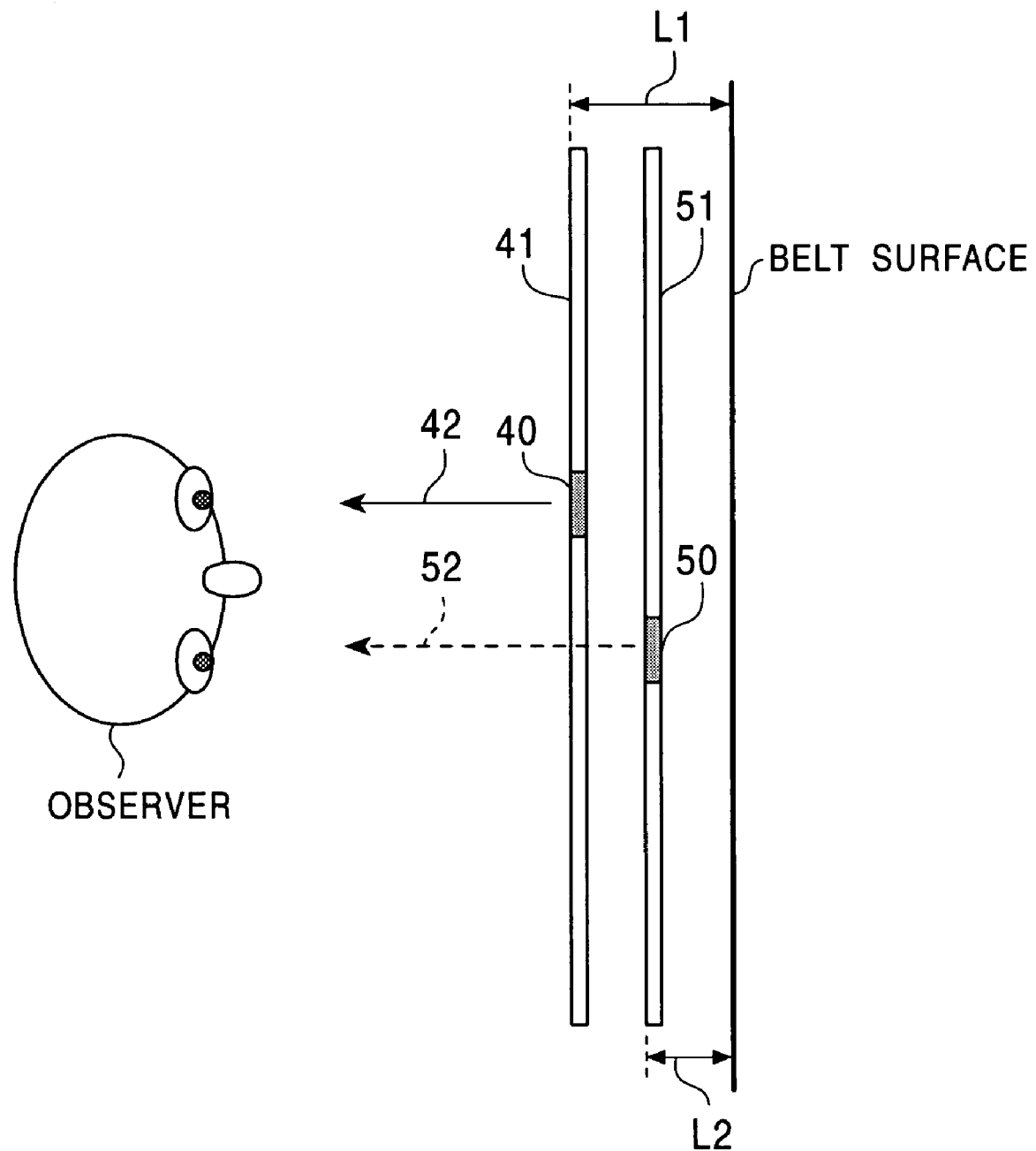
FIG. 5 illustrates an operation of the stereoscopic image display apparatus shown in FIG. 3.

Accordingly, as shown in FIG. 5, by driving the linear image display devices 40 and 50 at the velocity of 60 rounds per second in the direction perpendicular to the display directions of the devices, afterimage planes 41 and 51 by an afterimage effect are independently formed on a front face of the stereoscopic image display apparatus.

In this embodiment, each of the image planes displaying a stereoscopic image is divided into, for example, 160 regions such that the 160 regions are arranged in the horizontal direction. The divided regions where the linear image display devices respectively exist are detected by a location detecting means (not shown) such as a rotary encoder which is provided at the rotating shaft of the drive motor 10. Pixel information of the region along the vertical direction of the image plane are supplied to each of the linear image display devices, when the linear image display device is on the region. The pixel information represents luminance data of the LEDs, in which each LED corresponding to a pixel.

Specifically, in this embodiment, the display plane is divided into 120 (vertical direction)×160 (horizontal direction) pixels as an example of the operations. Therefore, during a scan time of 1/60 seconds performed by the drive belt 30, pixel data of all horizontally divided regions are supplied to the linear image display devices 40 and 50 region by region. The pixel data per each horizontally divided region includes 120 pixel data along the vertical direction. Consequently, the afterimage planes are generated.

Several methods are considered to supply control data which changes luminance of each LED included in the linear image display devices 40 and 50.

Figure 6:
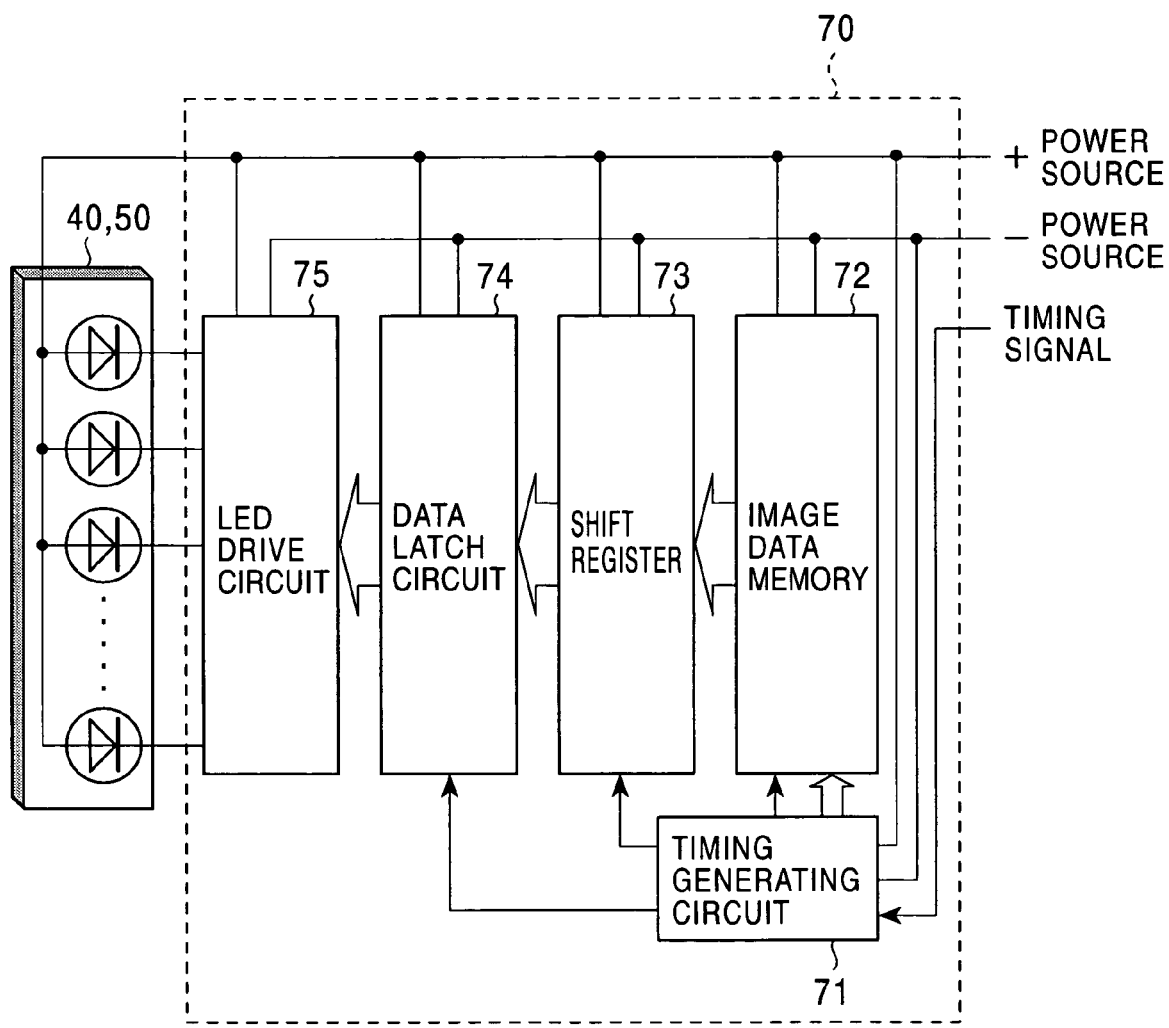
FIG. 6 is a block diagram showing a structure of an image signal supply section.

For example, an image signal supply section 70 shown in a block diagram of FIG. 6 may be used to supply a drive current to the LEDs included in the linear image display devices 40 and 50 for controlling luminance of the LEDs. An outline of an operation of the image signal supply section 70 shown in FIG. 6 is hereinafter described.

A timing generating circuit 71 including a microcomputer firstly receives a timing signal from an encoder (not shown) provided on the drive motor 10. The timing generating circuit 71 then generates a memory address signal and a read control signal, which are supplied to an image data memory 72 based on the timing signal. In addition, the timing generating circuit 71 generates a shift signal and a load signal in synchronization with the memory address signal and the read control signal.

In the image data memory 72, which is a memory circuit formed by a storage medium such as a semiconductor memory, pixel data forming a predetermined display image is stored. The pixel data stored in a predetermined memory address is read from the memory and supplied to a shift register 73 in accordance with the memory address signal and the read control signal supplied from the timing generating circuit 71.

The shift register 73 functions as a buffer memory. The shift register 73 sequentially outputs the pixel data read from the image data memory 72 to a data latch circuit 74 at predetermined timings in synchronization with the shift signal supplied from the timing generating circuit 71.

The data latch circuit 74 holds the pixel data along the vertical direction in a single horizontally divided region during the scan on such region. The data held in the data latch circuit 74 is rewritten in accordance with the load signal supplied from the timing generating circuit 71.

An LED drive circuit 75 is formed by, for example, an IC for a current load drive. The LED drive circuit 75 controls luminance of each LED mounted on the linear image display devices 40 and 50 in accordance with the pixel data supplied from the data latch circuit 74.

Specific location of the image signal supply section 70 in the stereoscopic image display apparatus of this embodiment is a matter of design during the actual product assembly, and thus the location is not specifically limited. When, for example, the image signal supply section 70 is provided on the linear image display device, the apparatus may have a plurality of strip electrodes parallel to a surface of the drive belt 30 so as to supply the aforementioned timing signal and a power-supply voltage to the image signal supply section 70 via a brush-shaped electrode unit which slidably contacts the strip electrodes.

In this embodiment, when displaying the afterimage plane 41 of the linear image display device 40 and the afterimage plane 51 of the linear image display device 50, brightness of each plane is controlled. In this instance, a proper distribution of the luminance between the two planes can provides a stereoscopic image for the observer who simultaneously observes a light beam 42 from the afterimage plane 41 and a light beam 52 from the afterimage plane 51.

In this embodiment, the two afterimage planes are respectively generated by using the linear image display devices which are provided at different positions with each other on the drive belt as described above. Therefore, when the backward afterimage plane is displayed, no obstruction exists which disturbs the observation of the backward after image plane. When the forward afterimage plane is displayed, no reflection of the emitted light occurs from the forward plane on the backward plane. Furthermore, since the antireflective device 60 is provided behind the two afterimage planes, the two afterimage planes are displayed as a front and a back plane in front of a dark and gloomy background. Accordingly, a bright and extremely clear stereoscopic image can be obtained.

A second embodiment of the present invention will be hereinafter described based on schematic construction drawings shown in FIGS. 7 and 8.

Figure 7:
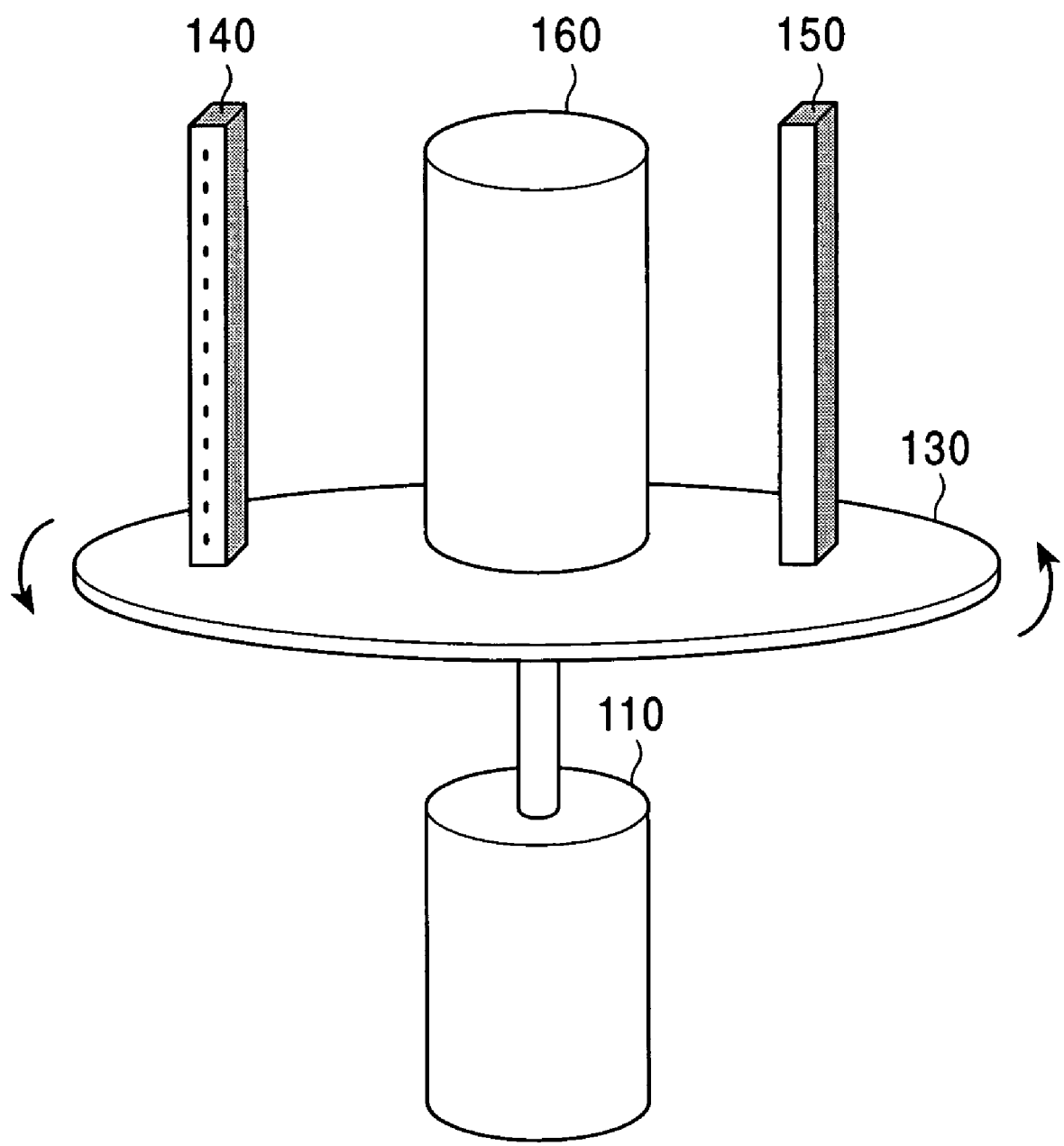
FIG. 7 is a schematic perspective view showing a structure of a stereoscopic image display apparatus according to a second embodiment of the present invention.
Figure 8:
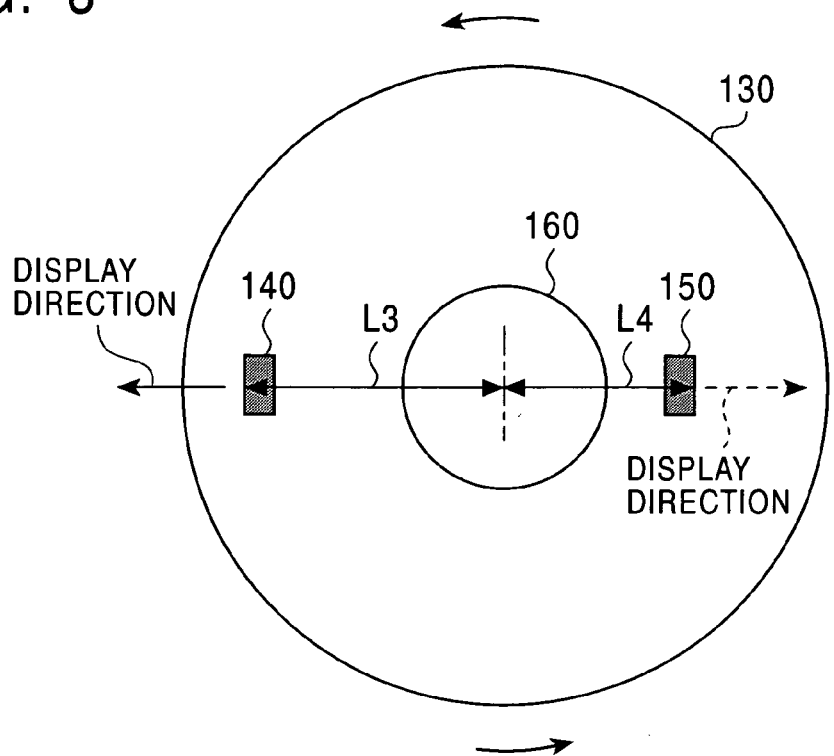
FIG. 8 is a schematic top view showing a top view of the stereoscopic image display apparatus shown in FIG. 7.

Referring to FIGS. 7 and 8, a drive motor 110, e.g., a servo motor, directly rotationally drives a disc base 130 fixed to a rotating shaft of the motor based on a control signal from a drive control circuit (not shown).

On the disc base 130, a linear image display device 140 is positioned at the distance L3 away from the center of the base, and a display direction of the device extends in a radial direction of the base. In a similar manner, a linear image display device 150 is positioned at the distance L4 away from the center of the base. An antireflective device 160 having a predetermined size is provided at a central area of the disc base 130. Further descriptions regarding the linear image display devices 140 and 150, and the antireflective device 160 are omitted, since they are similar to those describe in the first embodiment.

It should be noted that, in FIG. 8, even though the linear image display devices 140 and 150 are positioned on a diameter of the disc base 130 so as to be aligned with each other, positional relationship between the two linear image display devices is not limited to the above relationship.

An operation of the display apparatus of the second embodiment will be hereinafter described.

As the disc base 130 is driven in one direction at a predetermined rotating speed by the drive motor 10, the linear image display devices 140 and 150 provided on the disc base 130 are also driven at the same rotating speed. Since the display directions of the linear image display devices are directed to the radial direction of the disc base 130 as mentioned above, the linear image display devices 140 and 150 are driven in a direction perpendicular to the display directions of the devices. For example, when the rotating speed of the disc base 130 is set at 60 rotations per second, both of the linear image display devices 140 and 150 are also rotationally driven at velocities of 60 rotations per second. It should be noted that the rotating speed of the disc base 130 is not limited to the above number.

As shown in FIG. 8, a positional relationship between the linear image display devices 140 and 150 is arranged on the disc base 130 in such a manner that neither one of the linear image display devices intercepts the display direction of the other linear image display device. Therefore, the light emitted from either one of the linear image display devices is not intercepted by the other linear image display device. Moreover, no reflection of the emitted light occurs from either one of the linear image display devices on the other linear image display device.

Figure 9:
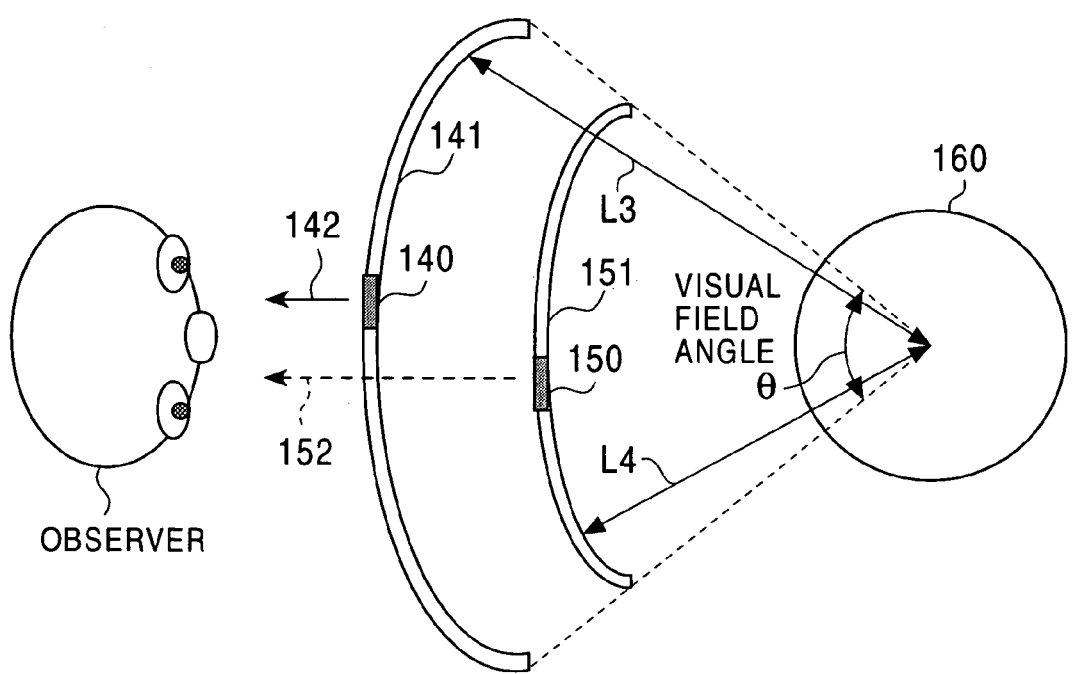
FIG. 9 illustrates an operation of the stereoscopic image display apparatus shown in FIG. 7.

Accordingly, by driving the linear image display devices 140 and 150 at the velocity of 60 rotations per second, afterimage planes 141 and 151 by an afterimage effect of the linear image display devices are independently formed on circumferences having radii L3 and L4, respectively. FIG. 9 illustrates this case. It should be noted that, in FIG. 9, a formation of the afterimage planes is shown only within a range having a predetermined visual field angle θ, which aims to limit the display image within an observer's visible range.

Similar to the first embodiment, each of the image planes within the range having the predetermined visual field angle θ displaying a stereoscopic image is horizontally divided into a plurality of regions. The divided regions where the linear image display devices respectively exist are detected, and pixel information of the region along the vertical direction of the image plane are supplied to each of the linear image display devices when the linear image display device is on the region. The pixel information represents luminance data of the LEDs, in which each LED corresponding to a pixel.

A proper distribution of the luminance between the images displayed on the two afterimage planes can provide a stereoscopic image for the observer who simultaneously observes a light beam 142 from the afterimage plane 141 and a light beam 152 from the afterimage plane 151. Description of the driving method of the LEDs included in the linear image display devices is omitted, since it is similar to that described in the first embodiment.

In the above embodiments, the two linear image display devices are utilized. However, the present invention is not limited to the above examples. For example, more than two linear image display devices may be utilized for displaying the stereoscopic image on condition that the afterimage plane displayed backward from the observer is not intercepted by the devices.

Furthermore, a plurality of linear image display devices may be provided one after another such that these image display devices appear within the same after image plane in the horizontal direction so as to obtain a stereoscopic image having an increased luminance.

This application is based on a Japanese patent application No. 2003-015934, the entire disclosure of which is incorporated herein by reference.

What is claimed is:

1. A stereoscopic image display apparatus comprising:
   at least two linear image display devices for respectively displaying linear images in response to image signals; and
   a moving mechanism section for periodically moving the at least two linear image display devices along at least two locus planes separated from each other and substantially parallel to each other,
   wherein said moving mechanism includes a pair of pulleys respectively rotating about a pair of rotating shafts, which are spaced apart from and parallel to each other, and a belt member extended between the pair of pulleys, and
   wherein each said linear image display device has a support member having a predetermined length and extending from the belt member and a display unit provided to an end of the support member, said predetermined length being different for one said linear image display device from another said linear display device.

2. The stereoscopic image display apparatus according to claim 1 further including at least two image signal supply sections for respectively supplying the image signals to the at least two linear image display devices.

3. The stereoscopic image display apparatus according to claim 2, wherein the at least two image signal supply sections are respectively provided on the at least two linear image display devices.

4. The stereoscopic image display apparatus according to claim 3 further including a plurality of strip electrodes parallel to a surface of the drive belt for supplying timing signals and power-supply voltages to each of the at least two image signal supply sections via each brush-shaped electrode unit which slidably contacts the strip electrodes.

5. The stereoscopic image display apparatus according to claim 1, wherein the at least two linear image display devices are fixed to the belt member at different locations of the belt member in a moving direction.

6. The stereoscopic image display apparatus according to claim 5 further including a rotary encoder provided at one of the pair of rotating shafts for detecting locations of the at least two linear image display devices.

7. The stereoscopic image display apparatus according to claim 1 further including an antireflective device behind and in parallel to the locus planes.

8. The stereoscopic image display apparatus according to claim 1, wherein each of the at least two linear image display devices includes a plurality of light emitting diodes aligned linearly.

9. The stereoscopic image display apparatus according to claim 1, wherein the moving mechanism section includes a pair of gears respectively rotating about a pair of rotating shafts, which are spaced apart and parallel to each other, and a chain extended between the pair of gears, and the at least two linear image display devices are fixed to the chain at different locations of the chain in a moving direction.

10. The stereoscopic image display apparatus according to claim 1, wherein the moving mechanism section includes a drive mechanism which transmits rotational movements to horizontal directional movements.

11. The stereoscopic image display apparatus according to claim 1, wherein each of the at least two linear image display devices moves in a direction perpendicular to a display direction of the at least two linear image display devices.

12. The stereoscopic image display apparatus according to claim 1, wherein each of the at least two linear image display devices includes a plurality of light bulbs, organic electroluminescence devices or electron emission devices for a field emission display, which are aligned linearly.

13. The stereoscopic image display apparatus according to claim 1, wherein each of the at least two linear image display devices includes a point light source which scans over the linear image display device in a longitudinal direction by a light emitted from the point light source.

14. A stereoscopic image display apparatus comprising:
   p1 at least two linear image display means for respectively displaying linear images in response to image signals; and
   moving means for periodically moving the at least two linear image display means along at least two locus planes separated from each other and substantially parallel to each other,
   wherein said moving means includes a pair of pulleys respectively rotating about a pair of rotating shafts, which are spaced apart and parallel to each other, and a belt member extended between the pair of pulleys, and
   wherein each said linear image display device has a support member having a predetermined length and extending from the belt member and a display unit provided to an end of the support member, said predetermined length being different for one said linear image display device from another said linear display device.

15. The stereoscopic image display apparatus according to claim 14 further including at least two image signal supply means for respectively supplying the image signals to the at least two linear image display means.

16. The stereoscopic image display apparatus according to claim 14, wherein the at least two linear image display means are fixed to the belt member at different locations of the belt member in a moving direction.

17. The stereoscopic image display apparatus according to claim 14 further including antireflective means behind and in parallel to the locus planes.

18. The stereoscopic image display apparatus according to claim 14, wherein each of the at least two linear image display means includes a plurality of light emitting diodes aligned linearly.

* * * * *